Nov. 6, 1934.  W. C. JACKSON  1,979,691
CUSHION AND WEATHER STRIP
Filed Jan. 6, 1933
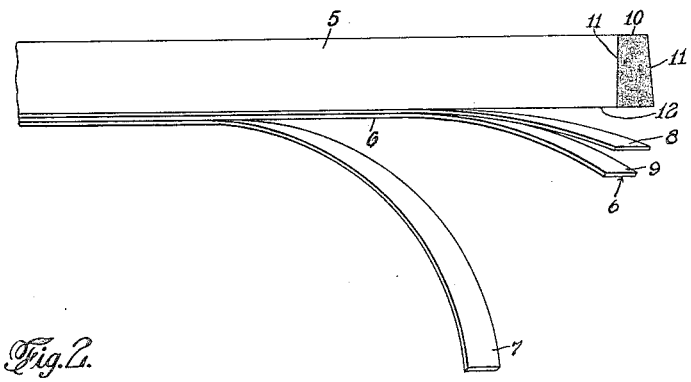
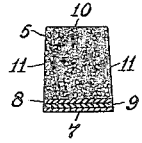
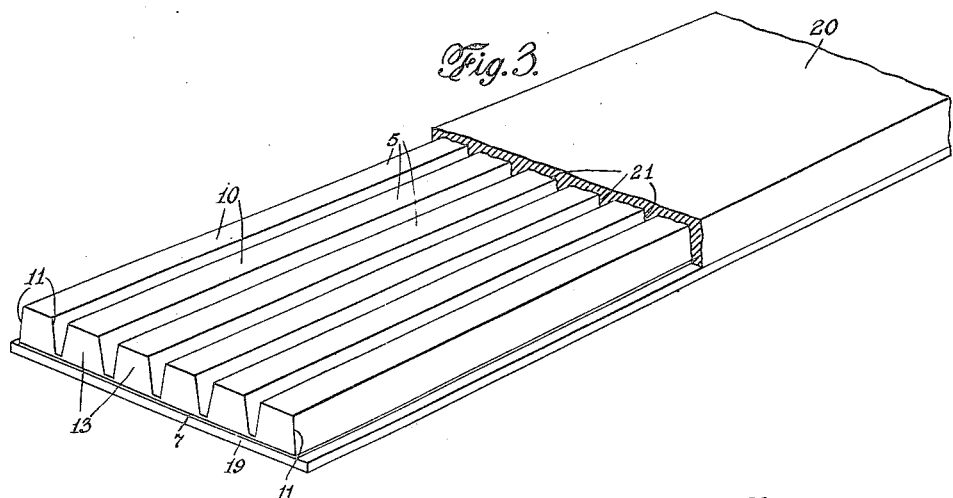
INVENTOR
WALTER C. JACKSON
BY
ATTORNEY Patented Nov. 6, 1934

1,979,691

UNITED STATES PATENT OFFICE 1,979,691

CUSHION AND WEATHER STRIP

Walter C. Jackson, Rahway, N. J., assignor to Tingley-Reliance Rubber Corporation, Rahway, N. J., a corporation of New Jersey Application January 6, 1933, Serial No. 650,515

2 Claims. (Cl. 154—43)

This invention relates to rubber weather strips and has for an object to provide a weather strip not only adapted for general purposes but particularly for use where it is desirable to have the door or other structure which it is intended to seal create a compressive action on the strip.

Another object of my invention is to form a weather strip of sponge rubber with an uncured facing.

Another object of the invention is to provide a weather strip formed entirely of rubber, the main body being presented in a highly compressible form such as sponge rubber provided with an uncured facing for adhering to the part to which the strip is to be applied.

A further object being to interpose between a compressible rubber portion, produced by vulcanization, and the uncured facing, a cured sheet of rubber for preventing the "migrating" of the vulcanizing agent from the sponge rubber into the facing stock and into the range of influence upon the sticky surface of such uncured face.

Another object of the invention is to provide an all rubber weather strip having a compressible portion and an uncured sticky face and a covering sheet for such face which is impervious to air and other gases.

Another object of the invention is to form a sponge rubber weather strip having its top and sides covered with a rubber skin and its lower side formed of uncured facing stock.

In the drawing accompanying this specification one practicable carrying out of my invention is illustrated in which drawing;

Figure 1 shows a portion of a weather strip in elevation, one end of the strip being shown separated into its elements.

Fig. 2 is a cross section of the strip shown in Fig. 1.

Fig. 3 is a perspective view of several of the weather strips united together in the usual manner in which they are molded and vulcanized, a convenient form of mold being illustrated as partly broken away, Figs. 4, 5 and 6 are details showing convenient steps of calendering together a raw rubber sheet and an impervious sheet for protecting the sticky or tacky surface of the completed article; this calendered sheet and an uncured vulcanizable sheet; and this latter calendered sheet and a sheet of sponge producing rubber stock.

As illustrated in Figures 1 and 2, my improved weather strip comprises a sponge rubber body portion 5 which, as is well known, is compressible and elastically yieldable. The lower surface, 6, of this weather strip is tacky or sticky and is protected during handling and up to a moment before its application by an impervious sheet 7. I have found that holland cloth is capable of giving and maintaining smooth surfaces to uncured rubber and of lightly adhering to it for considerable periods of time.

At the time of applying my improved cushion and weather strip to its location in use, the sponge rubber strip, 5, carries intimately bonded with it a vulcanized strip, 8, a raw rubber strip, 9, which has the tacky or adhering surface, 6, the sheet of protecting material 7 having been stripped off.

The sponge rubber strip, 5, has a skin formed on its top, 10, and its sides, 11, its rear face 12 being intimately bonded with the vulcanized strip, 8. As the strips come from the mold, their ends, 13, are also covered by a skin which is integrally connected with the skin covering the main body of the strip so that the interior of the sponge rubber strip is sealed and protected against the entrance of foreign matter.

A method which I have followed in the manufacture of my improved weather strip is to mold in the curing operation quite a number of the sponge rubber strips, 5, several of these strips being shown disposed side by side and connected at their bases in Fig. 3. The stock for this purpose is preferably built up by calendering operations, see Figures 4, 5 and 6. A sheet of raw rubber, 14, which, because of the nature of its composition, in the completed article will produce the uncured facing strip, 6, having a tacky or sticky surface previously described, see Figure 4, is calendered to the impervious sheet, 15, which is represented in Figures 1 and 2 by the reference character 7, and is of a material which is capable of giving a smooth surface to the uncured facing, 9, and of lightly adhering to it as for instance holland cloth. After the sheet of raw rubber has been calendered, see Figure 5, on to the holland sheet, an uncured sheet of vulcanizable rubber 16, which will make the sheet, 8, in the illustration is calendered on to the raw sheet, 14. A sheet of stock, 17, which is capable when being cured of forming sponge rubber is then, Figure 6, calendered on to the sheet, 16, of uncured vulcanizable rubber.

This built-up sheet is then placed in a box-like mold, 19, see Figure 3, and a cover, 20, furnished with a number of grooves, 21, suitably formed for giving shape to the tops and sides of the sponge rubber strips 5 is placed upon the sheet, after which suitable vulcanizing heat and pressure is applied to the mold to vulcanize the sheet 16 and to cause the material of the sponge forming sheet, 17, to "blow" and to be cured.

After the application of proper heat and pressure the portion, 17, of the stock is converted into the sponge strip, 5, having skin, 10, and 11 on their top and sides respectively. The lower surfaces, 12, also form skin in connection with the cured sheet of rubber, 8. This cured sheet of rubber, 8, is securely united with the uncured facing sheet, 9, the outer surface, 6, of which retains its tacky condition owing to the fact that the vulcanizing agents of the sponge rubber cannot pass thru the cured sheet, 8, with sufficient strength to affect the rubber of the uncured facing sheet which rubber is preferably what is known as raw rubber, which may be mixed if it is so desired with substances which are neutral to the vulcanizing agents present in this sponge rubber stock, 16, and the cured sheet, 8.

The advantage of this weather strip which is formed entirely of rubber, of course the holland cloth remains on the strip up to the time of its application when it is stripped off leaving the surface, 6, of the strip in a tacky condition when it may be caused to adhere directly to the surface to which it is applied. One of the principal advantages of forming this device entirely of rubber is that the strip may be readily bent sidewise, even at an acute angle, leaving the adhering face sufficiently flat that it may be squeezed into intimate and tight relation with the surface to which it is applied, and further the flexibility and yieldability of the parts is such that when the entire strip is thus bent in application if any wrinkling does take place in the sheet of cured rubber or the sheet of raw rubber, they are practically absorbed and the slight wrinkles adhere one to the other, presenting an unbroken surface to their carrying object and absorbing themselves in such a manner that they are not noticeably communicated to the sponge rubber body.

Changes may be made within the scope of the claims without departing from the spirit of my invention.

Having thus described my invention I claim and desire to secure by Letters Patent:

1. An all rubber cushion and weather strip, comprising a layer of vulcanized sponge rubber, a layer of vulcanized rubber resistant to the migration of rubber curing agents, and a layer of unvulcanized rubber, the last named layer being secured to one side of the resistant layer, and the first named layer being secured to its other side.

2. An all rubber cushion and weather strip, comprising a layer of vulcanized sponge rubber, a layer of vulcanized rubber resistant to the migration of curing agents from the sponge layer and retentive of its own curing agents, and a layer of unvulcanized rubber, the last named layer being secured to one side of the resistant layer, and the first named layer being secured to its other side.

WALTER C. JACKSON.